US008127106B2

(12) United States Patent
Nicholas et al.

(10) Patent No.: US 8,127,106 B2
(45) Date of Patent: Feb. 28, 2012

(54) ACCESS SPECULATION PREDICTOR WITH PREDICTIONS BASED ON A DOMAIN INDICATOR OF A CACHE LINE

(75) Inventors: Richard Nicholas, Round Rock, TX (US); Eric E. Retter, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 12/105,464

(22) Filed: Apr. 18, 2008

(65) Prior Publication Data
US 2009/0327612 A1 Dec. 31, 2009

(51) Int. Cl.
G06F 12/00 (2006.01)
G06F 9/26 (2006.01)
G06F 9/34 (2006.01)

(52) U.S. Cl. ...................................................... 711/204
(58) Field of Classification Search ......................... None
See application file for complete search history.

(56) References Cited

U.S. PATENT DOCUMENTS

| 5,634,103 | A | 5/1997 | Dietz et al. |
|---|---|---|---|
| 5,781,752 | A | 7/1998 | Moshovos et al. |
| 6,134,643 | A | 10/2000 | Kedem et al. |
| 6,321,307 | B1 | 11/2001 | Maguire et al. |
| 6,567,901 | B1 | 5/2003 | Neufeld |
| 6,622,222 | B2 | 9/2003 | Arimilli et al. |
| 6,718,441 | B2 | 4/2004 | Gonzales et al. |
| 6,799,257 | B2 | 9/2004 | Sprangle et al. |
| 6,820,173 | B1 | 11/2004 | Bittel et al. |
| 6,877,088 | B2 | 4/2005 | Dice |
| 7,058,767 | B2 | 6/2006 | Dodson et al. |
| 7,206,902 | B2 | 4/2007 | Hakura et al. |
| 2002/0087811 | A1 | 7/2002 | Khare et al. |
| 2002/0161979 | A1 | 10/2002 | Arimilli et al. |

(Continued)

FOREIGN PATENT DOCUMENTS

EP 0805390 A1 11/1997

(Continued)

OTHER PUBLICATIONS

Park et al., History-Based Memory Mode Prediction for Improving Memory Performance, 2003, IEEE, 4 pages.*

(Continued)

*Primary Examiner* — Kevin Ellis
*Assistant Examiner* — Gary W Cygiel
(74) *Attorney, Agent, or Firm* — Stephen J. Walder, Jr.; Matthew B. Talpis

(57) ABSTRACT

An access speculation predictor may predict whether to perform speculative retrieval of data for a data request from a main memory based on whether or not a domain indicator in the data request indicates that the cache line corresponding to the data has a special invalid state or not. In particular, a first address and a domain indicator are extracted from first data request. The first address is used to select a finite state machine (FSM) of a memory controller based on memory regions associated with the FSMs of the memory controller. Speculative retrieval of data for the first data request from main memory is controlled based on whether the domain indicator identifies the special invalid state or not and, if the domain indicator identifies that the cache line does not have the special invalid state, based on information stored in registers associated with the selected FSM.

23 Claims, 8 Drawing Sheets

U.S. PATENT DOCUMENTS

| | | |
|---|---|---|
| 2004/0059877 A1 | 3/2004 | Brown et al. |
| 2004/0199731 A1 | 10/2004 | Sprangle et al. |
| 2004/0215891 A1 | 10/2004 | Dodson et al. |
| 2005/0132148 A1 | 6/2005 | Arimilli et al. |
| 2005/0132175 A1 | 6/2005 | Henry et al. |
| 2005/0216705 A1 | 9/2005 | Shibayama et al. |
| 2006/0271744 A1 | 11/2006 | Goodman et al. |
| 2007/0005902 A1 | 1/2007 | Petersen et al. |
| 2007/0005938 A1 | 1/2007 | Grandou et al. |
| 2007/0088936 A1 | 4/2007 | Wilkerson et al. |
| 2007/0192545 A1 | 8/2007 | Gara et al. |
| 2008/0046658 A1 | 2/2008 | Goodman et al. |
| 2009/0265293 A1 | 10/2009 | Nicholas et al. |
| 2009/0327615 A1 | 12/2009 | Nicholas et al. |
| 2009/0327619 A1 | 12/2009 | Cantin et al. |

FOREIGN PATENT DOCUMENTS

| | | |
|---|---|---|
| JP | 9185506 A | 7/1997 |
| JP | 2000305841 A | 11/2000 |
| JP | 2001092801 | 4/2001 |
| JP | 2002351657 A | 12/2002 |

OTHER PUBLICATIONS

U.S. Appl. No. 12/105,401, filed Apr. 18, 2008, Cantin, Jason F. et al.

U.S. Appl. No. 12/105,427, filed Apr. 18, 2008, Nicholas, Richard et al.

U.S. Appl. No. 12/105,360, filed Apr. 18, 2008, Nicholas, Richard et al.

Chang, Po-Yung et al., "Improving Branch Prediction Accuracy by Reducing Pattern History Table Interference", International Journal of Parallel Programming, vol. 25, No. 5, Oct. 1997, pp. 339-362.

Kaxiras, Stefanos et al., "Improving CC_NUMA Performance Using Instruction-Based Prediction", Proceedings of the Fifth International Symposium on High Performance Computer Architecture, Jan. 1999, 10 pages.

Chang et al., "Improving Branch Prediction Accuracy by Reducing Pattern History Table Interference", IEEE, Proceedings of the 1996 Conference on Parallel Architectures and Compilation Techniques, PACT'96, Oct. 20-23, 1996, pp. 48-57.

Hao et al., "The Effect of Speculatively Updating Branch History on Branch Prediction Accuracy, Revisited", ACM, Proceedings of the 27th Annual International Symposium on Microarchitecture, 1994, MICRO-27, Nov. 30-Dec. 2, 1994, pp. 228-232.

Ando et al., "Unconstrained Speculative Execution with Predicated State Buffering", ACM, Proceedings of the 22nd Annual International Symposium on Computer Architecture, ISCA'95, Jun. 22-24, 1995, pp. 126-137.

Zhu et al., "Access-Mode Predictions for Low-Power Cache Design", IEEE Micro, vol. 22, Issue 2, Mar.-Apr. 2002, pp. 58-71.

U.S. Appl. No. 12/105,360.

U.S. Appl. No. 12/105,401.

U.S. Appl. No. 12/105,427.

Interview Summary mailed Sep. 23, 2011 for U.S. Appl. No. 12/105,427, 3 pages.

Notice of Allowability mailed Nov. 23, 2011 for U.S. Appl. No. 12/105,360, 5 pages.

Notice of Allowance mailed Oct. 4, 2011 for U.S. Appl. No. 12/105,360, 9 pages.

Notice of Allowance mailed Oct. 12, 2011 for U.S. Appl. No. 12/105,401, 9 pages.

Notice of Allowance mailed Oct. 26, 2011 for U.S. Appl. No. 12/105,427, 9 pages.

* cited by examiner

ACCESS SPECULATION PREDICTOR WITH PREDICTIONS BASED ON A DOMAIN INDICATOR OF A CACHE LINE

GOVERNMENT RIGHTS

This invention was made with United States Government support under Agreement No. HR0011-07-9-0002 awarded by DARPA. THE GOVERNMENT HAS CERTAIN RIGHTS IN THE INVENTION.

BACKGROUND OF THE INVENTION

1. Field of the Invention

The present application relates generally to an improved data processing apparatus and method and more specifically to an apparatus and method for implementing access speculation predictors that perform predictions based on a domain indicator of a cache line storing data for a memory region targeted by a data request.

2. Background of the Invention

Processors in a multi-processor computer system typically share system memory, which may be either in multiple private memories associated with specific processors, or in a centralized memory, in which memory access is the same for all processors. For example, FIG. 1 illustrates a multi-processor computer 100 utilizing a centralized memory system sometimes referred to as a "dance hall," in which processors 102 are on one "side" of a data bus 116 and system memories 114 are on the other "side" of the data bus 114. When a processor, such as processor 102a requires data from memory, it first checks its own L2 cache 106a, which is inclusive of the L1 cache 104a with regard to such snoops. If the data is not in either local cache, then a request is put out onto data bus 116, which is managed by bus arbiter 110. Cache controllers 108 "snoop" data bus 116 for requests for data that may be in their respective caches 106 or 104.

If no valid data is in any of the caches, then the data is retrieved from one of system memories 114, each being assigned a particular range of memory addresses, which are under the control of respective memory controllers 112. If speculation is not performed, then before a specific memory controller 112 accesses data from its respective system memory 114, the memory controller 112 waits until a combined response is returned to the data bus 116 by the bus arbiter 110 stating that the source of the valid data is the system memory.

Referring now to FIG. 2, a time line 200 illustrates the sequence of events in which a data request from a cache is performed. At time (1), the bus arbiter 110, in response to a query from one of the processors 102 (shown in FIG. 1), puts a data request on the data bus. At time (2), each cache controller 108 provides a "snoop" response, such as "retry," "busy," "valid data available," etc. The bus arbiter "collects" the snoop responses, and at time (3) issues an "early combined response," which is a hint (guess) as to where the valid data is stored. That is, the bus arbiter 110 puts out an early response predicting which cache, if any, has the valid coherent data. At time (4), the bus arbiter 110 issues a "combined response," which is a final response back to the bus confirming which cache controller 108, if any, has control and access to the requested data (or else that the request will be retried due to a bus collision or other delay).

As systems become more complex, as in more processors 102 (each with a dedicated cache controller 108) being connected to the data bus 116, the delay between the data request and the final combined response becomes much longer in a non-linear manner. That is, adding twice as many processors results in a time delay that is more than twice as long between the initial data request and the final combined response. This is due in part to the super-linear amount of time required for all cache controllers 108 to snoop and respond to the data request, and for the bus arbiter 116 to evaluate all of the cache controller responses and formulate the final combined response for broadcast back to the data bus 116.

In the event that none of the cache memories 106 or 108 have the requested valid data, then the data must be retrieved from one of the system memories 114. In an effort to minimize total time delay required to retrieve the data from a system memory 114 after a cache "miss," memory controllers 112 also "snoop" data requests on the data bus 116, and speculatively fetches data from their respective system memory 114 whenever the data request is for data at a memory address used by that system memory 114. That is, if a data request on data bus 116 is for data at an address used by system memory 114a, then memory controller 112a automatically speculatively pre-fetches the data at that address and stores the data in a queue in the memory controller 112a. This brute approach is highly inefficient, since many of the data requests are for data stored in cache memories, and thus an access to system memory is not needed. Automatically accessing the system memories 114 in this manner not only ties up valuable queue resources in the memory controller 112, but also delays necessary accesses to memory (cache misses), consumes excessive power, which also results in the generation of excessive heat and wastes valuable power, including battery power.

BRIEF SUMMARY OF THE INVENTION

In one illustrative embodiment, a method, in a data processing system, is provided for a data request from a main memory of the data processing system. The method may comprise extracting a first address and a domain indicator from a first data request. The domain indicator may identify whether or not a cache line associated with a memory block corresponding to the first address has a special invalid state. The method may further comprise comparing the first address to memory regions associated with second addresses stored in address registers of a plurality of finite state machines (FSMs) of a memory controller. Moreover, the method may comprise selecting a FSM whose memory region includes the first address. Furthermore, the method may comprise controlling whether to speculatively retrieve the data for the first data request from a main memory based on whether the domain indicator identifies the special invalid state or not and, if the domain indicator identifies that the cache line does not have the special invalid state, based on information stored in registers associated with the selected FSM.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
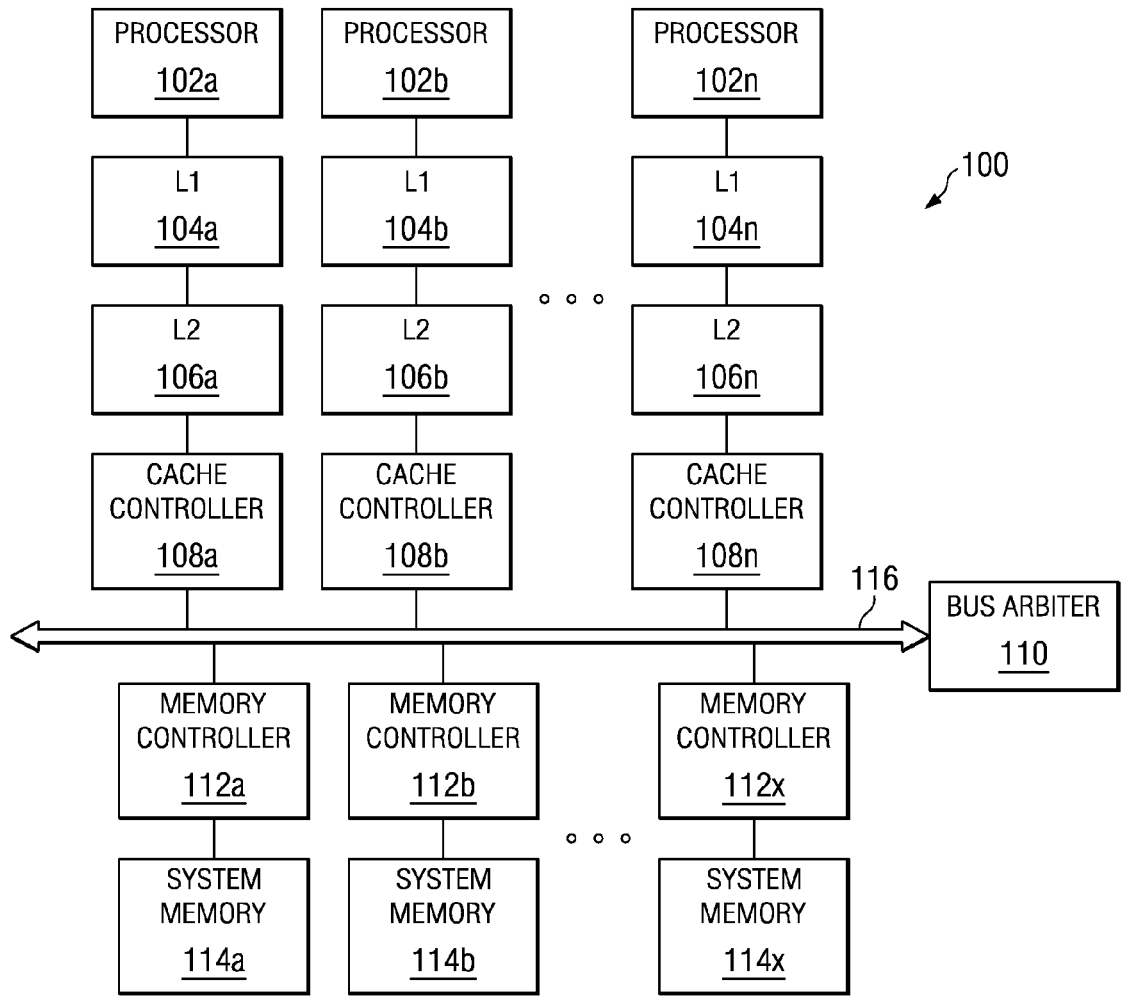
FIG. 1 is an exemplary block diagram of a multiprocessor computing system.

The illustrative embodiments provide mechanisms for providing a speculation predictor for determining if a memory access should be performed speculatively or not. The mechanisms of the illustrative embodiments may utilize existing idle resources of memory controllers to store history information for memory accesses to determine if subsequent memory accesses to a same memory region should be performed speculatively or not. Thus, the history is tied to the memory region and thereby constitutes a memory region history that is used to determine whether a memory access to that memory region should be performed speculatively or not. This is significantly different from known approaches to speculative data pre-fetch for memory accesses which, if they use a history structure at all, tie the history to numbers of data requests and whether a pre-fetch of the data for the data request returned a valid result or not.

In addition, the illustrative embodiments provide mechanisms for directing the storage of these history data structures to idle resources such that the same idle resources are used to store the history for the same memory region. The mechanisms for directing the storage of these history data structures performs a compare of an address and a 2K byte region of memory associated with the address. The mechanisms of the illustrative embodiments direct data requests using the same address or addresses within a 2K byte region to the same idle resources such that a history for the 2K byte memory region accumulates in the same idle resources.

In one illustrative embodiment, these idle resources are finite state machines (FSMs) and address registers of these FSMs that are typically used to determine address collisions. When an FSM is idle, the state of the FSM is typically a "don't care" state and the address register associated with the FSM is not utilized. The mechanisms of the illustrative embodiments uses these address registers of idle FSMs as a "tag" array for the long term state of memory regions. The history state information stored in these address registers may be provided as a 2-bit counter indicating whether an associated memory region (e.g., a 2K byte of memory) should or should not be accessed by a current data request speculatively or not.

In a further illustrative embodiment, mechanisms are provided for detecting whether there are multiple different requesters requesting data from the same memory region. The assumption is that if there are different requesters that are actively requesting data from the same memory region, then there is a high likelihood that the data in the memory region is being shared and thus, the data for this memory region will be in a cache of a requester rather than in the system memory. As a result, if multiple different requesters are requesting data from the same memory region, speculative data fetching for this memory region should not be performed.

In yet another illustrative embodiment, in an environment utilizing coherency domains, such as described in commonly assigned and co-pending U.S. Patent Application Publication No. 2006/0271744, for example, mechanisms are provided for determining whether a cache line corresponding to a memory region has been cached outside a coherency domain or not. In other words, a domain indicator may be provided for indicating whether a cache line of a cache of the local coherency domain has a special invalid state, e.g., invalid global (Ig) or an In state, indicating that there was a cache to cache transfer of the cache line. If the cache line has one of these special invalid states, then it can be determined that the data should not be retrieved speculatively from system or main memory since the valid data is most likely present in another node's cache.

If the cache line does not have one of these special invalid states, then it may be determined whether a scope predictor, such as described in co-pending U.S. Patent Application Publication No. 2006/0271744, indicates that a local or global broadcast operation, i.e. the operation is sent to just a local node (hereafter referred to as a "local request," or all nodes in the data processing system (hereafter referred to as a "global request", for obtaining the requested data will be required.

If a global request is identified by the scope predictor, and the relevant memory controller is also local to the master making the request, then speculative data fetching from system or main memory should not be performed since the data is most likely present in a cache that resides on a remote node. This is because a local master will try a local request first and only if the combined response indicates that the line is cached off node, will that master issue a global request. For all other cases, e.g., global request with relevant memory controller being non-local or local request being identified by the scope predictor, another level of prediction is performed. That is, in such other cases, speculative data fetching from system memory may be performed, depending on whether or not multiple requestors are accessing the same memory region and whether the history for the memory region indicates that speculative or non-speculative data fetching is appropriate. Using this prediction scheme, cases where a local request would have been used if the cache line holding the required data was expected to be obtained from system or main memory are captured. A global request indicates the cache line holding the required data is expected to be off node, i.e. not stored in the local node, which implies a cache transfer (since system or main memory is off node).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
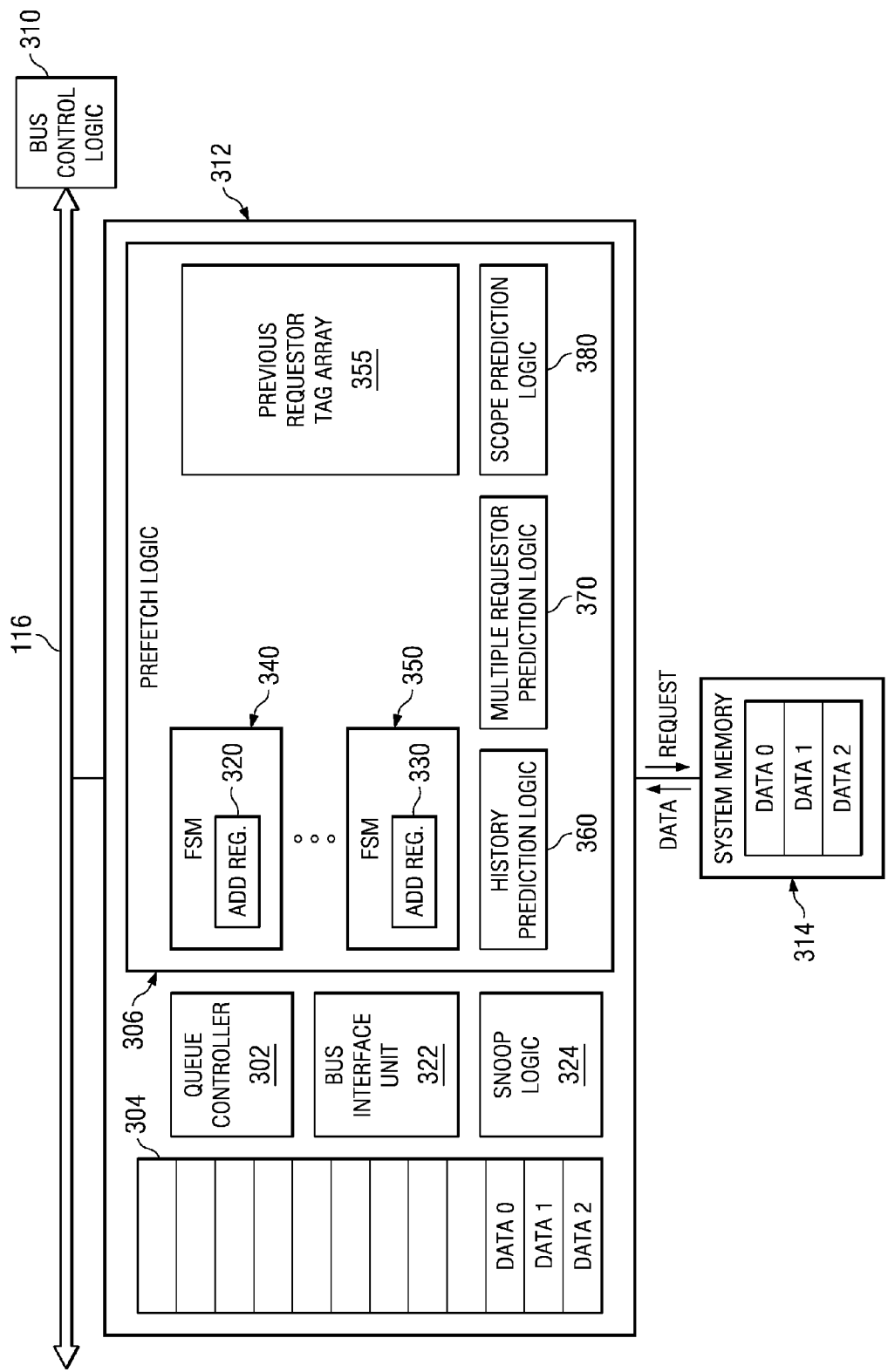
FIG. 3 is an exemplary diagram of a memory controller in accordance with one illustrative embodiment.

FIG. 3 is an exemplary diagram of a memory controller 312 in accordance with one illustrative embodiment. Although only a single memory controller 312 and associated system memory 314 are illustrated, it is understood that in a preferred embodiment memory controller 312 and system memory 314 may make up one pair of multiple memory/memory controller pairs connected to a interconnect such as exemplary data bus 116 in a computer system, having multiple processors with respective caches (now shown in FIG. 3, but substantially similar to the processors and cache/cache controllers shown in FIG. 1) coupled to an interconnect such as exemplary data bus 116.

Memory controller 312 includes a bus interface unit 322, which provides an interface to an interconnect, which in a preferred embodiment is data bus 116. It should be noted that while data bus 116 is used as an exemplary interconnect, such an interconnect may be a switch, bus or other interconnect known to those skilled in the art for providing a means of communication among processors, memories, caches, and controllers. Memory controller 312 also includes snoop logic 324, which detects the presence of data requests as well as responses on data bus 116. These responses include combined responses from cache controllers and other memory controllers as well as early combined responses and final combined responses generated by bus control logic 310. Bus control logic 310 is an exemplary mechanism for issuing data requests and response signals onto data bus 116. Exemplary response signals include, but are not limited to, signals signifying a data request has been issued, signals receiving snoop responses from the individual snoopers, an early combined response to the data request, and a final combined response to the data request.

A request for data stored in system memory 314 is sent from memory controller 312, and the result returned to a data queue 304, which is under the control of a queue controller 302. As illustrated, data queue 304 in a preferred embodiment is a First In First Out (FIFO) memory queue, but may be any type of register, stack or queue configuration desired by the implementer of the illustrative embodiment.

Figure 2:
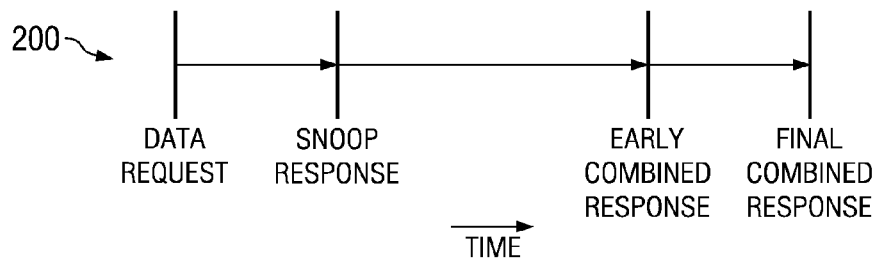
FIG. 2 is an exemplary diagram of a timeline for data requests and responses in the multiprocessor computing system of FIG. 1.

The request for data from memory controller 312 to system memory 314 may be a speculative pre-fetch or a "non-speculative" fetch. That is, the data request may be made before memory controller 312 "knows," as described below, that a data fetch is actually required from the system memory 314 associated with the specific memory controller 312, or the request may be made when memory controller 312 has confirmed that the data from system memory 314 is required to satisfy the data request, and thus returned to the data bus 116. If the data fetch is performed after a final combined response is returned, as shown and described above in FIG. 2, then the fetch is non-speculative. However, if the data fetch is performed before the final combined response is returned, such as when the data request is first broadcast on data bus 116 by a bus control logic 310, or when bus control logic 310 broadcasts a snoop response or an early combined response, then the data pre-fetch is speculative.

With regard to the illustrative embodiments, a determination as to when a data fetch is to be made is based on memory region history information stored in address registers 320-330 of finite state machines (FSMs) 340-350 of the pre-fetch logic 306. The pre-fetch logic 306 further comprises previous requester tag storage array 355, history prediction logic 360, multiple requester prediction logic 370, and scope prediction logic 380. These various prediction logic elements 360-380 operate individually or in combination to determine, based on their respective criteria, whether speculative or non-speculative data fetching should be performed with regard to a particular data request snooped from the bus via the snoop logic 324.

For example, the history prediction logic 360 uses history information associated with memory regions to predict whether or not speculative processing of a data request should be performed or not, i.e. data for the data request should be speculatively retrieved from main or system memory. This history information may be stored in registers associated with the FSMs 340-350.

The multiple requestor prediction logic 370 determines if speculative processing of a data request should be performed based on whether or not multiple requesters are accessing the same memory region or not. If multiple requestors are accessing the same memory region, then speculative processing should not be performed because the valid data is most likely in a local cache of a requester rather than in the main or system memory.

The scope prediction logic 380 determines if speculative processing of a data request should be performed based on special invalid states of the cache line of the data corresponding to the data request. Moreover, the scope prediction logic 380 further determines whether or not to perform speculative processing based on a scope of broadcast required to retrieve the valid data, as discussed in greater detail hereafter.

In a multiprocessor system, such as shown in FIG. 1, there are typically a set of finite state machines (FSMs) provided in the memory controllers, e.g., memory controllers 112a-112x, for performing operations of address collision detection and acknowledgement of a data request with snoop responses, such as a retry response. The FSMs each have an associated address register that stores an address of data for which a data request has been processed by the memory controller. For example, a FSM compares an address of a snooped data request with an address stored in the FSMs associated address register and if there is a match, and the address is determined to be a valid address, then the FSM sends an output to acknowledgement logic that combines the outputs of all the FSMs of the memory controller to determine how to respond to the snooped data request. If a FSM asserts a signal indicating that the address of the data request matches an address in the FSM's address register and the address is valid, then the acknowledgment logic generates a retry response to the bus control logic. A retry response is also generated by the acknowledgement logic if, when allocating a FSM to handle the data request, all of the FSMs are storing valid addresses in their address registers since the memory controller cannot then process the data request.

Figure 4A:
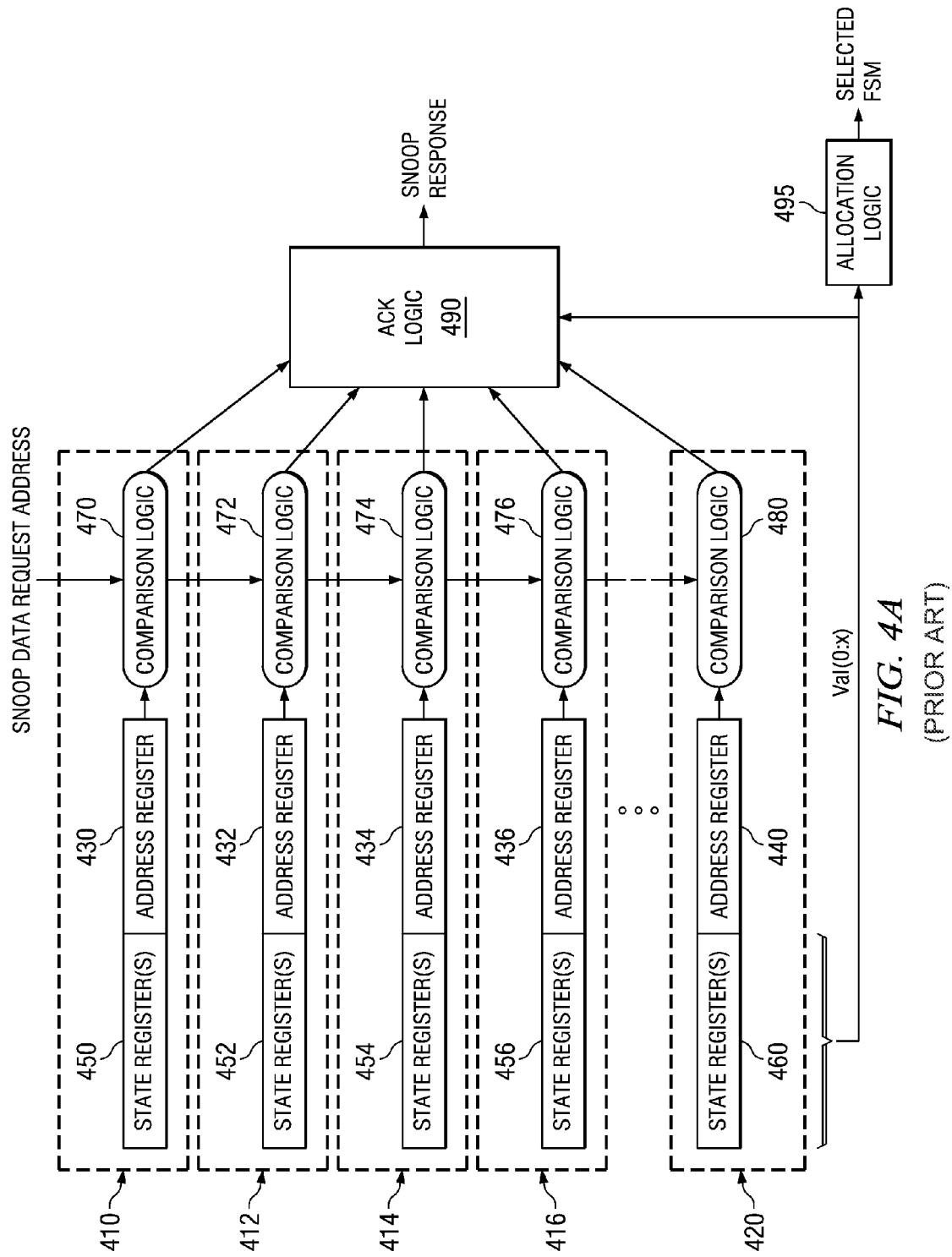
FIG. 4A is an exemplary block diagram illustrating the finite state machine structure of a memory controller that may be provided in a system such as that shown in FIG. 1.

FIG. 4A is an exemplary block diagram illustrating the finite state machine structure of a memory controller that may be provided in a system such as that shown in FIG. 1. As shown in FIG. 4A, a plurality of finite state machines (FSMs) 410-420 are provided that each comprise a set of one or more address registers 430-440, state bit storage registers 450-460, and comparison logic 470-480. The registers 430-440, together with the associated state bit storage registers 450-460, provide a data structure which may be represented as a logical table structure as shown, for example, in which valid state information and address information may be stored for each address being handled by the memory controller.

The comparison logic 470-480 of an FSM receives an address associated with a snooped data request and compares the address to the information stored in the FSM's corresponding address register 430-440. The comparison logic 470-480 outputs a signal to acknowledgement logic 490 indicating whether the comparison results in a valid match between the address of the snooped data request and the address stored in the FSM's corresponding address register 430-440, i.e. whether or not the addresses match and whether or not a matching address in the address registers 430-440 are valid or not. The acknowledgement logic 490 receives valid state information, val(0:x), for indicating whether a particular FSM is storing valid address information. The acknowledgement logic 490 receives the outputs from each of the comparison logic 470-480 of the FSMs 410-420, and the valid state information, and generates a snoop response based on the results of the comparisons by the comparison logic 470-480 of the FSMs 410-420 on the address of the snooped data request, as discussed previously. For example, if all of the FSMs are storing valid address information, then a retry snoop response may be generated.

In addition, the FSMs 410-420 provide the valid state information val(0:x) of their respective registers 450-460 to allocation logic 495. The allocation logic 495 allocates a FSM to handle an inbound data request. That is, as mentioned above, the memory controller has a set of FSMs for handling inbound data requests. The number of FSMs may be selected based on a desired maximum bandwidth for accessing main or system memory. However, the workload working on the processors of the multiprocessor system may not always require the maximum bandwidth and, as a result, many of these FSMs may be idle and thus store stale address information in their address registers 430-440, i.e. address information that was once valid but is no longer valid. The allocation logic 495 identifies those FSMs 410-420 that have stale address information stored in their corresponding address registers 430-440 and selects one of these FSMs 410-420 with stale address information to handle the snooped data request. The address information for the snooped data request is added to the register associated with the selected FSM and the state information is set in the corresponding state registers 450-460. As a result, if a subsequent data request for the same address is received while this FSM's address is still valid, the subsequent data request is retried thereby serializing accesses to the address.

Figure 4B:
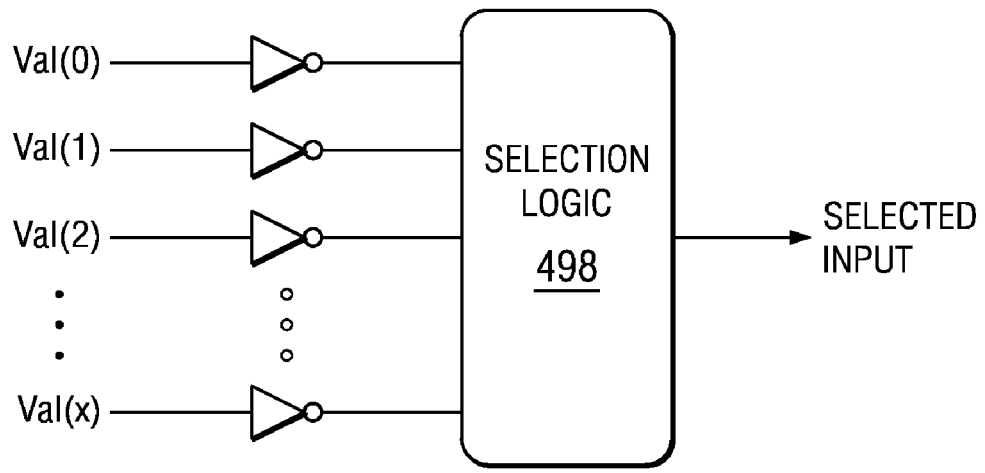
FIG. 4B is an exemplary circuit diagram illustrating allocation logic that may be used with the FSM structure of FIG. 4A.

FIG. 4B is an exemplary circuit diagram illustrating allocation logic that may be used with the FSM structure of FIG. 4A. As shown in FIG. 4B, the valid state information for each of the FSMs 410-420 is received from the state registers 450-460 and inverted before being provided to selection logic 498. Thus, if the valid information indicates that the address is valid, the inverted input to the selection logic 498 is a logic low state, e.g., a logic 0. If the valid information indicates that the address is stale, i.e. invalid, the inverted input to the selection logic 498 is a logic high state, e.g., a logic 1. The selection logic 498 may then select one of the inputs having a logic high state for output as the selected FSM for handling the snooped data request. The selection may be performed in a number of different ways including using a round-robin approach, a fixed priority scheme, or the like, whose logic is provided in the selection logic 498. In this way, any of the FSMs that have stale, i.e. invalid, address information may be selected to handle an incoming snooped data request.

It is desirable to know whether speculatively accessing main memory for a data request should be performed or not so as to avoid unnecessary power consumption, excessive heat generation, tying up queue resources in the memory controller, delaying necessary memory operations, and other inefficiencies associated with brute force approaches typically used in the prior art. Thus, it would be desirable to have a mechanism for predicting whether speculative retrieval of data from main or system memory is appropriate or not for a data request. The illustrative embodiments herein provide such a speculative prediction mechanism which utilizes the address registers of the FSMs that have invalid address information to store history information that may be used to predict whether speculative retrieval of data from main or system memory should be performed with regard to a particular memory region. Thus, the history information is tied to the memory region and thereby constitutes a memory region history that is used to determine whether a memory access to that memory region should be performed speculatively or not.

In addition, the illustrative embodiments provide mechanisms for directing the storage of this history information for a memory region to the same FSM for data requests targeting addresses within the same memory region. The mechanisms for directing the storage of this history information performs a compare of an address of a snooped data request with addresses stored in address registers of FSMs as well as an aligned memory region, e.g., an aligned 2K byte memory region, associated with each of these addresses. If the address of the snooped data request does not match the address in the address register of a FSM, but is within the 2K byte memory region of the address in the address register, that FSM may still be used to update the history information for the memory region. That is, the FSM may still be allocated for use in handling the data request such that the history information for the memory region may be updated. In this way, the mechanisms of the illustrative embodiments direct data requests using the same address or addresses within a 2K byte region to the same FSM resources such that a history for the 2K byte memory region accumulates in the same FSM.

As noted above, when an FSM is idle, the state of the FSM is typically a "don't care" state and the address register associated with the FSM is not utilized. The mechanisms of the illustrative embodiments use these address registers of idle FSMs as a "tag" array for the long term state of memory regions. The address for a data request may be stored in these idle FSM address registers with associated history information being stored in these address registers which may be provided as a 2-bit counter indicating whether an associated memory region (e.g., a 2K byte of memory) should or should not be accessed by a current data request speculatively or not.

In a further illustrative embodiment, mechanisms are provided for detecting whether there are multiple different requesters, e.g., processes executing on one or more processors of the multiprocessor system, requesting data from the same memory region. The assumption is that if there are different requesters that are actively requesting data from the same memory region, then there is a high likelihood that the data in the memory region is being shared and thus, the data for this memory region will be in a cache of a requester rather than in the system memory. As a result, if multiple different requesters are requesting data from the same memory region, speculative data fetching for this memory region should not be performed.

In yet another illustrative embodiment, in an environment utilizing coherency domains, such as described in commonly assigned and co-pending U.S. Patent Application Publication No. 2006/0271744, for example, mechanisms are provided for determining whether a cache line corresponding to a memory region has been cached outside a coherency domain or not. In other words, a domain indicator may be provided for indicating whether a cache line of a cache of the local coherency domain has a special invalid state, e.g., invalid global (Ig) or an In state, indicating that there was a cache to cache transfer of the cache line. If the cache line has one of these special invalid states, then it can be determined that the data should not be retrieved speculatively from system or main memory since the valid data is most likely present in another node's cache.

As discussed previously, if the cache line does not have one of these special invalid states, then it may be determined whether a scope predictor, such as described in co-pending U.S. Patent Application Publication No. 2006/0271744, indicates that a local request or global request for obtaining the requested data will be required. If a global request is identified by the scope predictor, and the relevant memory controller is also local to the master making the request, then speculative data fetching from system or main memory should not be performed since the data is most likely present in a cache that resides on a remote node. For all other cases, e.g., global request with relevant memory controller being non-local or local request being identified by the scope predictor, another level of prediction is performed. That is, in such other cases, speculative data fetching from main or system memory may be performed, depending on whether or not multiple requestors are accessing the same memory region and whether the history for the memory region indicates that speculative or non-speculative data fetching is appropriate.

Figure 5:
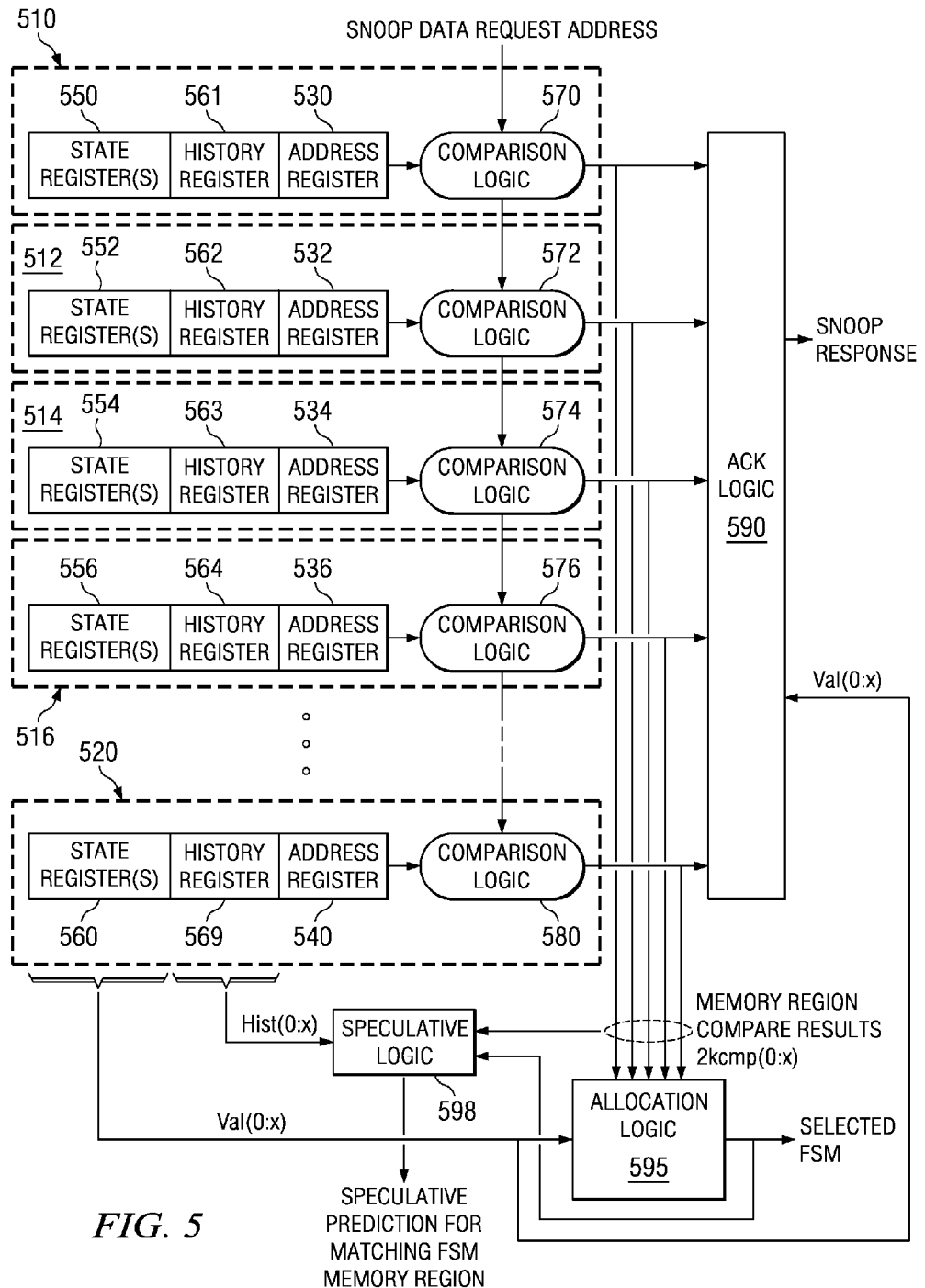
FIG. 5 is an exemplary block diagram illustrating a finite state machine (FSM) structure of a memory controller in accordance with one illustrative embodiment.

FIG. 5 is an exemplary block diagram illustrating a finite state machine (FSM) structure of a memory controller in accordance with one illustrative embodiment. As shown in FIG. 5, a plurality of finite state machines (FSMs) 510-520 are provided that each comprise an address register 530-540, state registers 550-560, and comparison logic 570-580. The address registers 530-540 and state registers 550-560 together provide a data structure, which may be represented as a logical table structure as shown, for example, in which valid state information and address information may be stored for each address being handled by the memory controller. In addition, the state registers 550-560 may further store history information 561-569 indicative of the history of speculative data retrieval from a memory region associated with the address specified in the address information. This history information 561-569 is updated with each subsequent data request targeting the same memory region and the coherence system responses received for such data requests.

In one illustrative embodiment, this history information is a 2 bit counter value that is incremented/decremented by the corresponding FSM based on coherence system responses observed by the FSM for data requests directed to the memory region associated with the address of the FSM. Based on the value of the 2 bit counter, it can be determined whether a particular data request should be speculatively or non-speculatively performed. For example, in one illustrative embodiment, if the 2 bit counter has a value of 0 or 1, then data requests targeting the memory region are not performed speculatively. If the 2 bit counter has a value of 2 or 3, then speculative processing of the data requests to the memory region are performed.

The comparison logic 570-580 of the FSMs receive an address associated with a snooped data request and compare the address to the information stored in the FSM's corresponding address registers 530-540. The comparison logic 570-580 outputs a signal to acknowledgement logic 590 indicating whether the comparison results in a valid match between the address of the snooped data request and the address stored in the FSM's corresponding address register 530-540, i.e. whether or not the addresses match and whether or not a matching address in the registers 530-540 are valid or not, as specified by the state information in the corresponding state registers 550-560. The acknowledgement logic 590 receives the outputs from each of the comparison logic 570-580 of the FSMs 510-520 and generates a snoop response based on the results of the comparisons by the comparison logic 570-580 of the FSMs 510-520 on the address of the snooped data request, as discussed previously.

In addition to performing the address comparison discussed above, the comparison logic 570-580 also performs a memory region comparison to determine if the address of the snooped data request is within a memory region of the address stored in the address register 530-540 of the corresponding FSM 510-520. In one illustrative embodiment, this memory region is a 2K byte aligned memory region associated with the address. For example, if the address is at the beginning of the memory region, then the memory region encompasses addresses from the specified address up to 2K bytes above that specified address. It should be noted that while a 2K byte aligned memory region is used in the description of the illustrative embodiments, this is only exemplary and is not intended to state or imply any limitation of the present invention with regard to the type of memory region that may be used. The 2K byte memory region was selected for illustrative purposes based on empirically obtained data for one type of data processing system and other data processing systems, architectures, configurations, etc., may utilize other sizes of memory regions without departing from the spirit and scope of the present invention.

The result of the comparison of the address of the snooped data request to the memory region is output to allocation logic 595 for allocating a FSM 510-520 for handling the data request. The allocation logic 595 looks at both the valid state of the address stored in an address register 530-540 of the FSM 510-520 and the result of the memory region comparison for the memory region associated with the address stored in the address register 530-540 to select a FSM 510-520 to handle the data request. By looking at both these criteria, the mechanisms of the illustrative embodiment send data requests targeting the same memory region to the same FSM such that the history information for the memory region may be updated and maintained for use in determining whether to speculatively process the data request or not. The allocation logic 595 outputs a selection of the FSM 510-520 which may be fed to the speculative logic 598 for example, for selection of which history compare data is used for the speculative logic 598 prediction.

Figure 6:
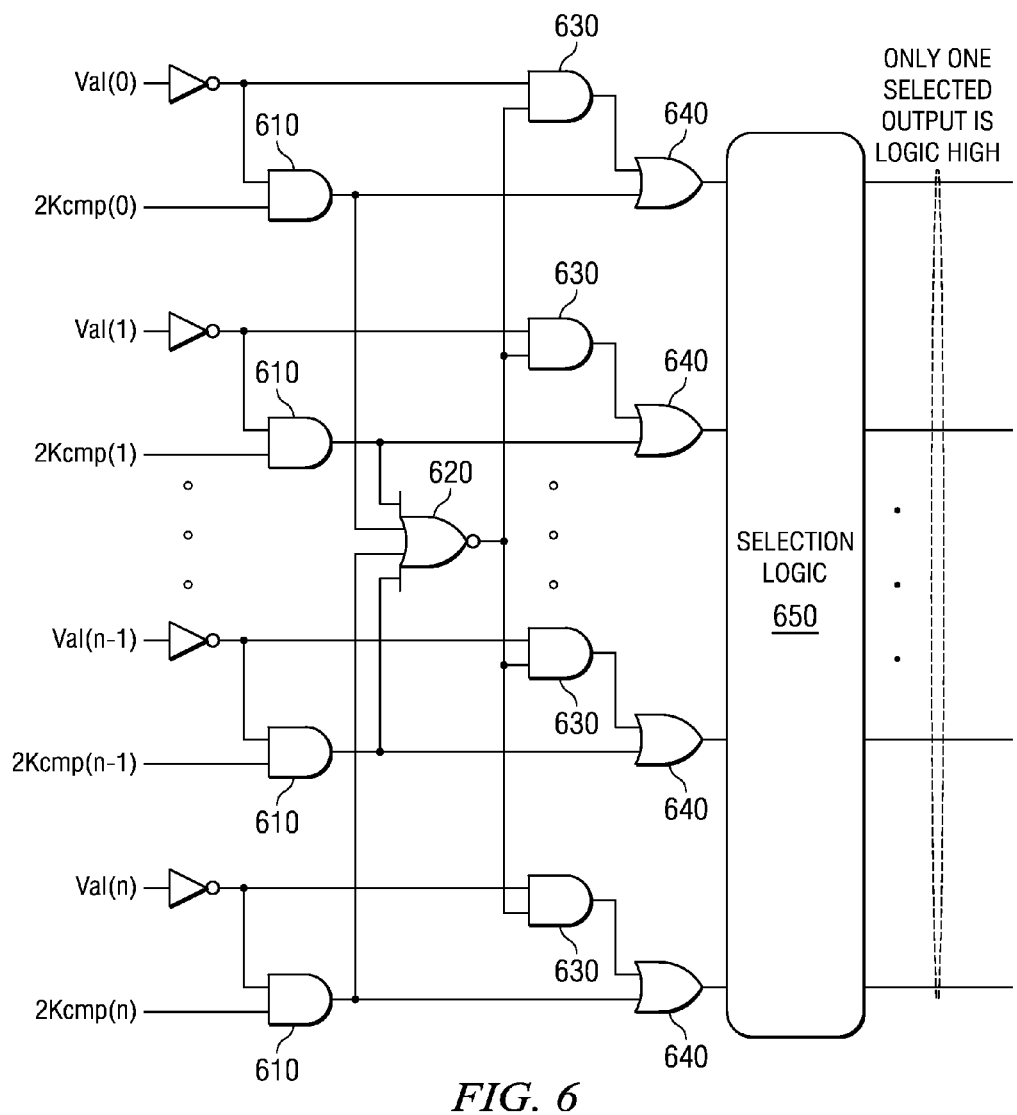
FIG. 6 is an exemplary diagram of allocation logic in accordance with one illustrative embodiment.

FIG. 6 is an exemplary diagram of allocation logic in accordance with one illustrative embodiment. The allocation logic shown in FIG. 6 essentially inhibits the selection of FSMs having invalid address information stored in their address registers if the address of a snooped data request is within the memory region of another FSM. If the address of the snooped data request is not within the memory region of any of the addresses stored in the address registers of the FSMs, then all of the FSMs are candidates for selection to handle the snooped data request. FIG. 6 is a circuit diagram illustrating one mechanism for implementing such a mechanism.

As shown in the circuitry of FIG. 6, if an address stored in the address register of the FSM is invalid, i.e. val(x)=0, which is inverted to a logic high signal (i.e. 1), and the address of the snooped data request is within the memory region, i.e. 2kcmp(x)=1, then the AND gate 610 outputs a logic high signal (i.e. 1) to the NOR gate 620. If any of the inputs to the NOR gate 620 from the AND gates 610 for each FSM are 1, then the NOR gate 620 outputs a logic low signal (i.e. 0) to the AND gates 630. This essentially causes the AND gate 630 associated with any FSM that has an invalid address in its address register, i.e. val(x)=0, to output a logic low signal (i.e. 0) to the OR gate 640. If the address of the snooped data request is within the memory region (2kcmp(x)=1), then the OR gate 640 outputs a logic high signal (i.e. 1) to the selection logic 650. Thus, FSMs having invalid addresses in their address registers, and for which the address of the snooped data request is within the memory region corresponding to the invalid address, are considered for selection by the selection logic 650.

The NOR gate 620 outputs a logic high signal (i.e. 1) only if all of the inputs to the NOR gate 620 are logic low signals (i.e. 0). This happens whenever the inputs to AND gates 610 are not both logic high input signals (i.e. 1). Thus, the AND gates 610 only output a logic high signal if the address of the snooped data request is within the memory region of the stored address for the FSM and the address stored in the address register of the FSM is invalid. If either the stored address is valid or the address of the snooped data request is not within the memory region, the AND gate 610 outputs a logic low signal (i.e. 0). Thus, if any of the FSMs stores an invalid address and the address of the snooped data request is within the memory region of the invalid address, then the NOR gate 620 outputs a logic low signal (i.e. 0). This essentially inhibits each FSM having an invalid stored address from being selected unless the address of the snooped data request is within the memory region of the invalid stored address. If the address of the snooped data request is not within the memory regions of any of the FSMs' stored addresses, then the NOR gate 620 outputs a logic high signal (i.e. 1) and all FSMs having invalid addresses stored in their address registers may be considered for selection by the selection logic 650.

The selection logic 650 selects one FSM for use in handling the snooped data request based on the inputs having a logic high state. The particular manner by which the selection is performed may use any desirable selection scheme. For example, the selection scheme may be a fixed priority selection scheme, a round robin selection scheme, or the like. If the address of the snooped data request is within a memory region of a certain FSM, typically this will be the only FSM considered for selection and thus, the selection scheme does not matter. In this way, the same FSM is selected for data requests targeting the same memory region as previous data requests.

As mentioned above, the history information, e.g., the 2 bit history counter, is updated by the FSM in response to detecting a coherence response for a particular memory region. Thus, for example, if a coherence response is received indicating that speculative data retrieval is appropriate for the memory region, then the 2 bit history counter may be incremented in the FSM corresponding to the memory region, as determined by the memory region around the address stored in the FSM's address register. If the coherence response indicates that speculative data retrieval is not appropriate for the memory region, then the 2 bit history counter may be decremented in the FSM. This history information may be used by speculative logic, such as speculative logic 598 in FIG. 5, to determine whether data for a received request targeting the memory region corresponding to the history information should be retrieved speculatively from main or system memory or not. That is, the speculative logic 598 may determine the state of the 2 bit history counter and determine whether speculative or non-speculative data fetching from main or system memory should be performed and may then generate an output of this prediction to the corresponding memory controller.

Figure 7:
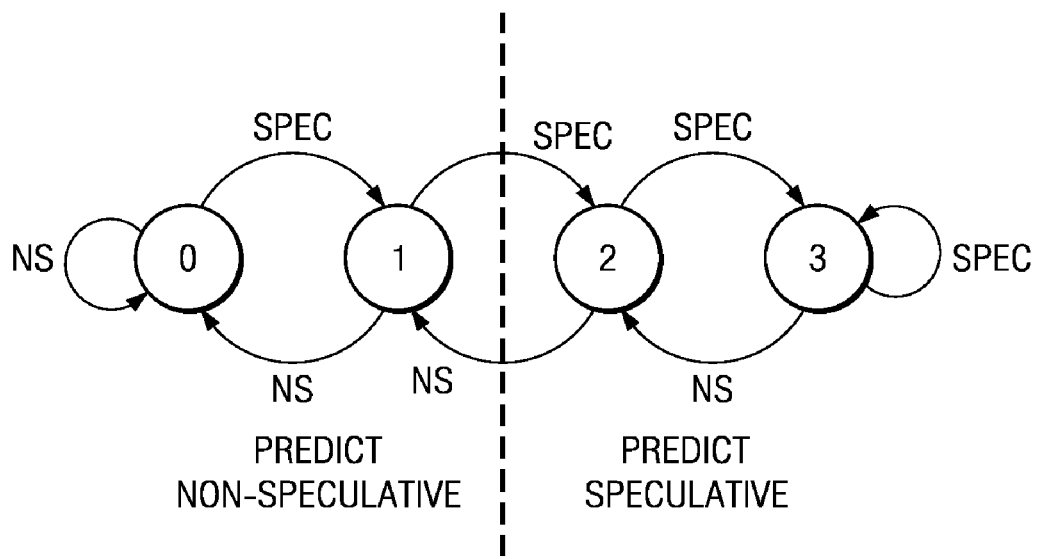
FIG. 7 is an exemplary state diagram of a 2 bit history counter in accordance with one illustrative embodiment.

The FSM may, with regard to a 2 bit history counter, implement a state diagram such as that shown in FIG. 7. As shown in FIG. 7, the 2 bit history counter may have any of states 0-3. If the 2 bit history counter has a state 0 and should be decremented according to the received coherence response, the 2 bit history counter holds on the 0 state. Similarly, if the 2 bit history counter has a state of 3 and should be incremented according to the received coherence response, the 2 bit history counter holds on the 3 state. As shown in FIG. 7, if the state of the 2 bit history counter is either 0 or 1, this is indicative that speculative processing of a data request should not be performed. If the state of the 2 bit history counter is either 2 or 3, this is indicative that speculative processing of a data request should be performed.

The state of the 2 bit history counter is used to identify whether a snooped data request targeting a corresponding memory region should be handled speculatively or not. When the comparison logic determines that the address of a snooped data request is within a memory region of an address stored in the address register of a FSM, the state of the 2 bit history counter of the FSM is read and provided to speculative logic for informing the speculative logic as to whether the data request should be speculatively processed or not, e.g., by retrieving the data from main or system memory prior to knowing whether the data needs to be retrieved from main or system memory or not. The data may then be either speculatively retrieved from main or system memory, or not speculatively retrieved, with resulting coherency information indicating whether the speculative or non-speculative processing of the snooped data request was appropriate or not. This coherency information is then used to update the history information for the memory region. For example, this coherency information may be a combined response that is sent back from the bus arbiter indicating if the memory controller will return data or not. If the memory controller will return the required data, then the 2 bit history counter's state is moved toward speculation, i.e. is incremented. If the memory controller will not return the required data, then the 2 bit history counter's state is moved toward non-speculation, i.e. is decremented.

Thus, with the illustrative embodiments, history information for a memory region is maintained in FSMs of a memory controller having invalid address information, i.e. FSMs that are idle. This history information is then used to determine whether subsequent data requests on a bus should be handled speculatively or not. In this way, it is possible to predict whether speculative processing of a data request is appropriate or not and in so doing, wasted resource utilization and power consumption may be minimized.

As a further enhancement to the above mechanisms, the status registers of the memory controller may further store tag information for requestors that have previously submitted data requests for memory regions associated with the addresses stored by the FSMs. This tag information, which identifies the requestor may be compared with tag information for a snooped data request to determine if more than one requestor is accessing the same memory region or not. If multiple requestors are accessing the same memory region, then it can be assumed that the data for the memory region in main or system memory is not going to be valid, since the valid data is most likely in a cache of one of the requesters and has not yet been written back to main or system memory. Thus, speculative data retrieval from main or system memory is not appropriate and may be inhibited by the logic of the memory controller. However, if the tag of the requestor for the snooped data request matches the stored tag for a previous requester accessing the memory region, then speculative processing of the data request may be appropriate and may be performed by the logic of the memory controller. For example, if the tag of the requestor for the snooped data request matches the stored tag for the previous requester accessing the memory region, the history information may be used as discussed above to select whether or not to speculatively process the data request or not. Alternatively, the mechanisms for this enhancement may be implemented and used independently of the history information mechanism previously discussed above such that the if the tags match, speculative processing of the data request is performed.

Figure 8:
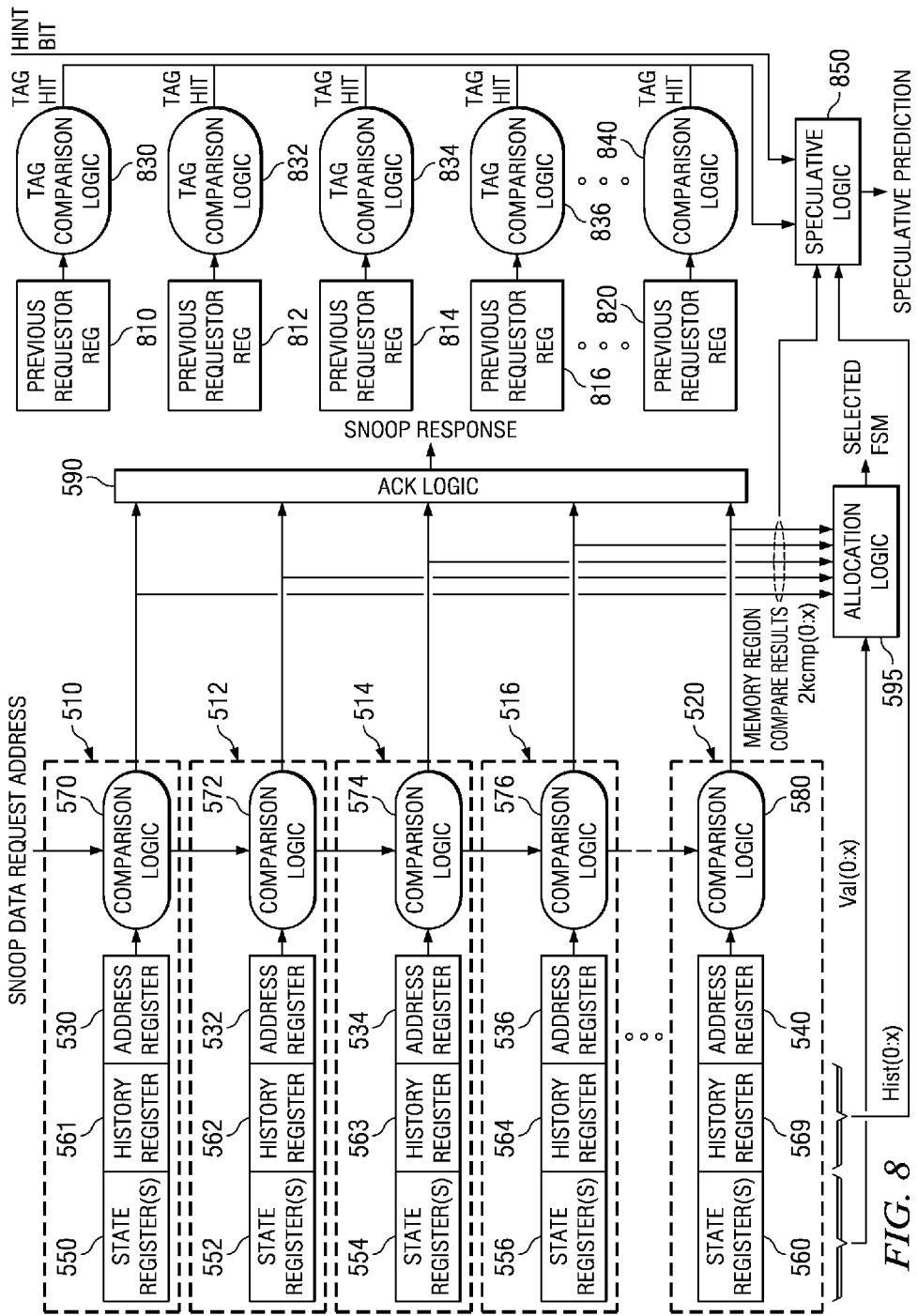
FIG. 8 illustrates a memory controller in which previous requester tag information is maintained and utilized to determined whether to speculatively process a snooped data request in accordance with one illustrative embodiment.

FIG. 8 illustrates a memory controller in which previous requester tag information is maintained and utilized to determined whether to speculatively process a snooped data request in accordance with one illustrative embodiment. As shown in FIG. 8, the memory controller is essentially the same as that shown in FIG. 5 with the addition of previous tag registers 810-820 and tag comparison logic 830-840 in the FSMs 510-520. When an FSM is selected for handling a data request, the address and requester tag information, which is typically provided in such a data request, are extracted and stored in the FSM's associated registers. When a subsequent data request is received, a FSM corresponding to the address of the subsequent data request is identified in the manner described previously. The corresponding previous requester tag information is extracted from the FSM's previous tag registers 810-820 and compared against the requester tag of the data request. If there is not a match, then an output is sent from the comparison logic 830-840 to speculative logic 850 indicating that the speculative logic 850 should not speculatively process the snooped data request. If there is a match, then an output indicating that speculative processing should be performed may be generated by the comparison logic 830-840. Alternatively, the comparison logic 830-840 may output a signal indicating that the tags matched to the speculative logic 850 which may then check the history information for the FSM to determine whether or not to speculatively process the snooped data request.

In yet another enhancement, in an environment utilizing coherency domains, such as described in commonly assigned and co-pending U.S. Patent Application Publication No. 2006/0271744, for example, mechanisms are provided for determining whether a cache line corresponding to a memory region of a FSM has been cached outside a coherency domain or not, i.e. whether the cache line is cached in a local cache of a coherency domain or not. In other words, a domain indicator may be provided for indicating whether a cache line of a cache of the local coherency domain has a special invalid state, e.g., invalid global (Ig) or an In state, indicating that there was a cache to cache transfer of the cache line. If the cache line has one of these special invalid states, then it can be determined that the data should not be retrieved speculatively from system or main memory since the valid data is most likely present in another node's cache.

As described in co-pending U.S. Patent Application Publication No. 2006/0271744, the cache structure of the data processing system, via the memory controllers, may implement a cache coherency protocol in which, in order to avoid having to access the main or system memory to determine whether or not a memory block is known to be cached, if at all, only locally to a coherency domain, the invalid global (Ig) coherency state is utilized to maintain a domain indication in cases in which no copy of a memory block remains cached in a coherency domain. The Ig state is defined as a cache coherency state indicating (1) the associated memory block in the cache array is invalid, (2) the address tag in the cache directory is valid, and (3) a copy of the memory block identified by the address tag may possibly be cached in another coherency domain. The In state is defined as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. If either of these states is associated with a memory block or memory region, then the valid data for the memory region is likely in a cache and not in system or main memory. Thus, when determining whether to speculatively access main or system memory, if the memory region has one of these states, then speculative processing of a data request targeting the memory region should not be performed.

Therefore, as shown in FIG. 8, the memory controller may further receive a hint input 860 indicating whether or not a cache line corresponding to a memory region being accessed by a data request has a special invalid state or not. This hint input 860 may be obtained from the snooped data request and indicates an Ix state of the memory block with regard to the requester, i.e. requesting processor. The Ix state of the memory block with regard to other processors is not known at this time. The hint input 860 may have a first state if the memory region accessed by the data request has a Ig or In state with regard to the requestor, and a second state if the memory region accessed by the data request does not have one of these special invalid states with regard to the requester, indicating that the valid data is stored in a cache of the data processing system. If the hint input 860 has a state indicating an Ig or On state of the requester, then speculative retrieval of data for the data request may be inhibited by the logic of the memory controller. If the hint input 860 does not have such a state, then speculative retrieval of data for the data request may be performed by the logic of the memory controller, or additional prediction mechanisms, such as described herein, may be utilized to determine whether to speculatively retrieve data for the data request.

As discussed previously, if the cache line does not have one of these special invalid states, then it may be determined whether a scope predictor, such as described in co-pending U.S. Patent Application Publication No. 2006/0271744, indicates that a local request or global request for obtaining the requested data will be required. If a global request is identified by the scope predictor, and the relevant memory controller is also local to the master making the request, then speculative data fetching from system or main memory should not be performed since the data is most likely present in a cache that resides on a remote node. For all other cases, e.g., global request with relevant memory controller being non-local or local request being identified by the scope predictor, another level of prediction is performed. That is, in such other cases, speculative data fetching from main or system memory may be performed, depending on whether or not multiple requestors are accessing the same memory region and whether the history for the memory region indicates that speculative or non-speculative data fetching is appropriate.

The scope predictor is obtained from the snooped data request sent by the requester, i.e. the requesting processor. That is, the requesting processor, in response to a local cache miss being detected, queries its local/global scope predictor information and sends the local/global scope predictor information with the data request which is snooped by the memory controller. As described in co-pending U.S. Patent Application Publication No. 2006/0271744, this scope predictor information is used for a variety of tasks as the data request is sent through the system, e.g., routing and coherence processing.

Figure 9:
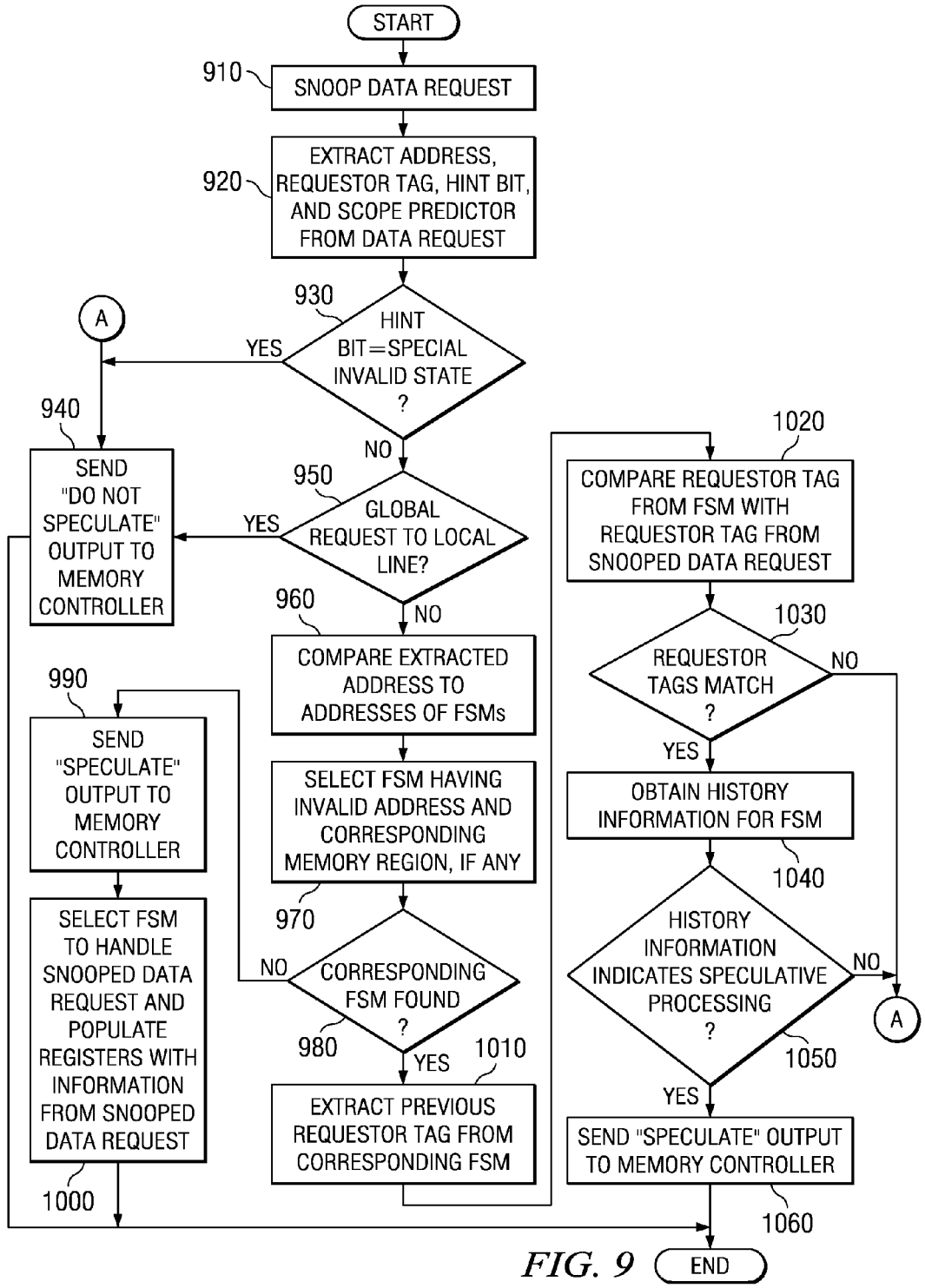
FIG. 9 is a flowchart outlining an exemplary operation for determining whether to speculatively process a data request in accordance with one illustrative embodiment.

FIG. 9 is a flowchart outlining an exemplary operation for determining whether to perform a speculative processing of a snooped data request in accordance with one illustrative embodiment. The operation outlined in FIG. 9 may be implemented by a memory controller, for example. The operation outlined in FIG. 9 uses a combination of the embodiments described above, i.e. using the history information counter, the previous requestor tag comparison, special invalid state determination, and scope predictor determination. It should be appreciated that any one of these different mechanisms may be used individually or in combination with a subset of the other mechanisms, for predicting whether speculative processing of a data request will be appropriate or not.

As shown in FIG. 9, the operation starts by snooping a data request (step 910). The address, requester tag, hint bit, and scope predictor for the data request are extracted from the data request (step 920). A determination is made as to whether the hint bit indicates that the memory region is has a special invalid state, e.g., Ig or In, and most likely present in a cache (step 930). If so, a "do not speculate" output is sent to the memory controller to instruct the memory controller not to speculatively process the data request by speculatively retrieving the data from main or system memory (step 940). If the memory region does not have one of these special invalid states, then a determination as to whether global request to a local cache line is required, i.e. whether the data of the data request is only within a local coherency domain or not, to obtain the data based on the scope predictor (step 950). If a local request is all that is required, then a "do not speculate" output is sent to the memory controller (step 940).

If a global request is required, then further determination is made as to whether to speculate or not. That is, in one illustrative embodiment, "local scope" commands are never excluded from speculative processing just because they are local scope. However, some "global scope" commands are excluded (i.e., a "do not speculate" is generated) if the master making the global scope request is local to the node of the cache line it is requesting, i.e. the master making the request and the memory controller that owns the cache line are on the same node. Alternatively, a "speculate" output may be sent to the memory controller in response to a determination that a global request is required.

In order to perform further determinations as to whether to speculate or not, the address of the snooped data request is compared to a memory region associated with each of the addresses stored in the FSMs (step 960) and a FSM having an invalid, or stale, stored address and a memory region in which the address of the snooped data request falls is selected, if any (step 970). If no corresponding FSM is found (step 980), then a "speculate" output is sent to the memory controller (step 990) and a FSM is selected for handling the snooped data request and appropriate state registers, address registers, history registers, request tag registers, and the like, are populated with information from the data request or initialized as necessary (step 1000).

If a corresponding FSM is identified, the requestor tag for the previous requester that targeted the memory region is extracted from the requester tag register associated with the FSM (step 1010). The stored requestor tag is compared with the requester tag obtained from the snooped data request (step 1020). If there is not a match (step 1030), then a "do not speculate" output is sent to the memory controller (step 940). If there is a match, the history information for the selected FSM is obtained (step 1030). A determination is made as to whether the history information indicates that speculative processing of the data request is appropriate or not (step 1040). If the history information indicates to not speculatively process the data request (step 1050), e.g., a value of the history counter is 0 or 1, then a "do not speculate" output is sent to the memory controller (step 940). If the history information indicates to speculatively process the data request (step 1050), e.g., a value of the history counter is 2 or 3, then a "speculate" output is sent to the memory controller (step 1060). The operation then terminates.

Thus, the illustrative embodiments provide mechanisms for predicting whether to speculatively process a snooped data request. The illustrative embodiments store information indicative of whether speculative processing of a snooped data request will result in valid data being retrieved and used at a later time, thereby increasing the efficiency of the data processing system. Moreover, the illustrative embodiments, based on such information, may be used to inhibit such speculative processing when conditions indicate, as determined from this stored information, that such speculative processing will not result in valid data being retrieved and thus, speculatively processing the data request will waste time, resources and power. The mechanisms of the illustrative embodiments operate based on a speculation history associated with a memory region to which the data request is targeted, as well as historical information regarding previous requestors accessing the memory region, and other information indicating whether or not the valid data for the memory region is most likely in system or main memory, or in a cache within the data processing system.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for predicting whether to perform speculative retrieval of data for a data request from a main memory of the data processing system, comprising:

extracting a first address and a domain indicator from a first data request, wherein the domain indicator identifies whether or not a cache line associated with a memory block corresponding to the first address has a special invalid state;

comparing the first address to memory regions associated with second addresses stored in address registers of a plurality of finite state machines (FSMs) of a memory controller;

selecting a FSM whose memory region includes the first address; and controlling whether to speculatively retrieve the data for the first data request from a main memory based on whether the domain indicator identifies the special invalid state or not and, if the domain indicator identifies that the cache line does not have the special invalid state, based on information stored in registers associated with the selected FSM, wherein controlling whether to speculatively retrieve the data for the first data request from a main memory based on information stored in registers associated with the selected FSM comprises:

extracting a first requestor tag from the first data request;

retrieving a second requestor tag from a register associated with the selected FSM, wherein the second requestor tag identifies a previous requestor that previously submitted a second data request targeting the memory region associated with the selected FSM;

comparing the first requestor tag to the second requestor tag; and controlling whether to speculatively retrieve the data for the first data request from the main memory based on results of the comparison of the first requestor tag to the second requestor tag.

2. The method of claim 1, wherein the special invalid state is an invalid state indicating that there has been a cache transfer of the cache line.

3. The method of claim 1, wherein if the domain indicator indentifies that the cache line has a special invalid state, then it is determined that the data for the data request should not be speculatively retrieved from the main memory.

4. The method of claim 3, wherein controlling whether to speculatively retrieve the data for the first data request from the main memory comprises inhibiting speculatively retrieving the data from main memory if the domain indicator identifies that the cache line has a special invalid state.

5. The method of claim 1, wherein the special invalid state is one of a first invalid state indicating that the memory block is invalid, the first address is valid, and a copy of the memory block associated with the first address is possibly cached in a non-local node, or a second invalid state indicating that the memory block is invalid, the first address is valid, and a copy of the memory block associated with the first address is only available in a cache of a local node.

6. The method of claim 1, wherein the selected FSM is an idle FSM having an address in an associated address register that is indicated to be invalid.

7. The method of claim 1, wherein if the first requestor tag does not match the second requestor tag, then a determination is made that multiple requestors are accessing the same memory region associated with the selected FSM and speculative retrieval of the data for the first data request should not be performed.

8. The method of claim 7, wherein controlling whether to speculatively retrieve the data for the first data request from the main memory comprises inhibiting speculatively retrieving the data from the main memory if the first requestor tag does not match the second requestor tag.

9. The method of claim 1, wherein if the first requestor tag matches the second requestor tag, then a determination is made that multiple requestors are not accessing the same memory region associated with the selected FSM and speculative retrieval of the data for the first data request should be performed.

10. The method of claim 9, wherein controlling whether to speculatively retrieve the data for the first data request from the main memory comprises speculatively retrieving the data from the main memory if the first requestor tag matches the second requestor tag.

11. The method of claim 9, wherein, if the first requestor tag matches the second requestor tag, the method further comprises:

obtaining history information for the memory region from the selected FSM; and controlling whether to speculatively retrieve the data for the first data request from the main memory based on the obtained history information.

12. A computer program product comprising a computer readable storage device having a computer readable program stored thereon, wherein the computer readable program, when executed on a computing device, causes the computing device to:

extract a first address and a domain indicator from a first data request, wherein the domain indicator identifies whether or not a cache line associated with a memory block corresponding to the first address has a special invalid state;

compare the first address to memory regions associated with second addresses stored in address registers of a plurality of finite state machines (FSMs) of a memory controller;

select a FSM whose memory region includes the first address; and control whether to speculatively retrieve the data for the first data request from a main memory based on whether the domain indicator identifies the special invalid state or not and, if the domain indicator identifies that the cache line does not have the special invalid state, based on information stored in registers associated with the selected FSM, wherein the computer readable program causes the computing device to control whether to speculatively retrieve the data for the first data request from a main memory based on information stored in registers associated with the selected FSM by:

extracting a first requestor tag from the first data request;

retrieving a second requestor tag from a register associated with the selected FSM, wherein the second requestor tag identifies a previous requestor that previously submitted a second data request targeting the memory region associated with the selected FSM;

comparing the first requestor tag to the second requestor tag; and controlling whether to speculatively retrieve the data for the first data request from the main memory based on results of the comparison of the first requestor tag to the second requestor tag.

13. The computer program product of claim 12, wherein the special invalid state is an invalid state indicating that there has been a cache transfer of the cache line.

14. The computer program product of claim 12, wherein if the domain indicator indentifies that the cache line has a special invalid state, then it is determined that the data for the data request should not be speculatively retrieved from the main memory.

15. The computer program product of claim 14, wherein the computer readable program causes the computing device to control whether to speculatively retrieve the data for the first data request from the main memory by inhibiting speculatively retrieving the data from main memory if the domain indicator identifies that the cache line has a special invalid state.

16. The computer program product of claim 12, wherein the special invalid state is one of a first invalid state indicating that the memory block is invalid, the first address is valid, and a copy of the memory block associated with the first address is possibly cached in a non-local node, or a second invalid state indicating that the memory block is invalid, the first address is valid, and a copy of the memory block associated with the first address is only available in a cache of a local node.

17. The computer program product of claim 12, wherein if the first requestor tag does not match the second requestor tag, then a determination is made that multiple requestors are accessing the same memory region associated with the selected FSM and speculative retrieval of the data for the first data request should not be performed.

18. The computer program product of claim 17, wherein the computer readable program causes the computing device to control whether to speculatively retrieve the data for the first data request from the main memory by inhibiting speculatively retrieving the data from the main memory if the first requestor tag does not match the second requestor tag.

19. The computer program product of claim 12, wherein if the first requestor tag matches the second requestor tag, then a determination is made that multiple requestors are not accessing the same memory region associated with the selected FSM and speculative retrieval of the data for the first data request should be performed.

20. The computer program product of claim 19, wherein the computer readable program causes the computing device to control whether to speculatively retrieve the data for the first data request from the main memory by speculatively retrieving the data from the main memory if the first requestor tag matches the second requestor tag.

21. The computer program product of claim 19, wherein, if the first requestor tag matches the second requestor tag, the computer readable program further causes the computing device to:
    obtain history information for the memory region from the selected FSM; and
    control whether to speculatively retrieve the data for the first data request from the main memory based on the obtained history information.

22. The computer program product of claim 12, wherein the selected FSM is an idle FSM having an address in an associated address register that is indicated to be invalid.

23. An apparatus, comprising:
    a processor; and
    a memory coupled to the processor, wherein the memory comprises instructions which, when executed by the processor, cause the processor to:
        extract a first address and a domain indicator from a first data request, wherein the domain indicator identifies whether or not a cache line associated with a memory block corresponding to the first address has a special invalid state;
        compare the first address to memory regions associated with second addresses stored in address registers of a plurality of finite state machines (FSMs) of a memory controller;
        select a FSM whose memory region includes the first address; and
        control whether to speculatively retrieve the data for the first data request from a main memory based on whether the domain indicator identifies the special invalid state or not and, if the domain indicator identifies that the cache line does not have the special invalid state, based on information stored in registers associated with the selected FSM, wherein the instructions further cause the processor to control whether to speculatively retrieve the data for the first data request from a main memory based on information stored in registers associated with the selected FSM by:
    extracting a first requestor tag from the first data request;
    retrieving a second requestor tag from a register associated with the selected FSM, wherein the second requestor tag identifies a previous requestor that previously submitted a second data request targeting the memory region associated with the selected FSM;
    comparing the first requestor tag to the second requestor tag; and
    controlling whether to speculatively retrieve the data for the first data request from the main memory based on results of the comparison of the first requestor tag to the second requestor tag.

* * * * *